US007742044B2

(12) United States Patent
Yu et al.

(10) Patent No.: US 7,742,044 B2
(45) **Date of Patent: *Jun. 22, 2010**

(54) SOURCE-FOLLOWER TYPE ANALOGUE BUFFER, COMPENSATING OPERATION METHOD THEREOF, AND DISPLAY THEREWITH

(75) Inventors: Cheng-Ho Yu, Yuanlin Township (TW); Fu-Yuan Hsueh, Bade (TW); Wei-Cheng Lin, Kaohsiung (TW); Keiichi Sano, Taipei (TW); Ya-Hsiang Tai, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 733 days.

This patent is subject to a terminal disclaimer.

(21) Appl. No.: 11/546,161

(22) Filed: Oct. 10, 2006

(65) Prior Publication Data

US 2007/0040591 A1 Feb. 22, 2007

Related U.S. Application Data

(63) Continuation-in-part of application No. 11/356,160, filed on Feb. 16, 2006.

(30) Foreign Application Priority Data

Aug. 19, 2005 (TW) .............................. 94128342 A

(51) Int. Cl.
*G06F 3/038* (2006.01)
*G09G 5/00* (2006.01)

(52) U.S. Cl. ...................................................... 345/204

(58) Field of Classification Search ........... 345/1.1–3.2, 345/204–215, 30–111
See application file for complete search history.

(56) References Cited

U.S. PATENT DOCUMENTS

| | | | | |
|---|---|---|---|---|
| 6,801,161 | B2 * | 10/2004 | Lehtomaki et al. | 342/377 |
| 7,405,720 | B2 * | 7/2008 | Nakajima et al. | 345/100 |
| 2007/0040591 | A1 * | 2/2007 | Yu et al. | 327/108 |
| 2007/0052650 | A1 * | 3/2007 | Tai et al. | 345/98 |

* cited by examiner

*Primary Examiner*—Srilakshmi K Kumar
(74) *Attorney, Agent, or Firm*—Liu & Liu

(57) ABSTRACT

A source-follower-type analogue buffer with an active load, a new compensating operation and a display with the source-follower-type analogue buffers are developed to reduce an error voltage which is the difference between an input voltage and an output voltage of the analogue buffer. The source-follower type analogue buffer can also minimize the variation from both the charging time and the device characteristics and maximize the range of the input voltage.

9 Claims, 18 Drawing Sheets

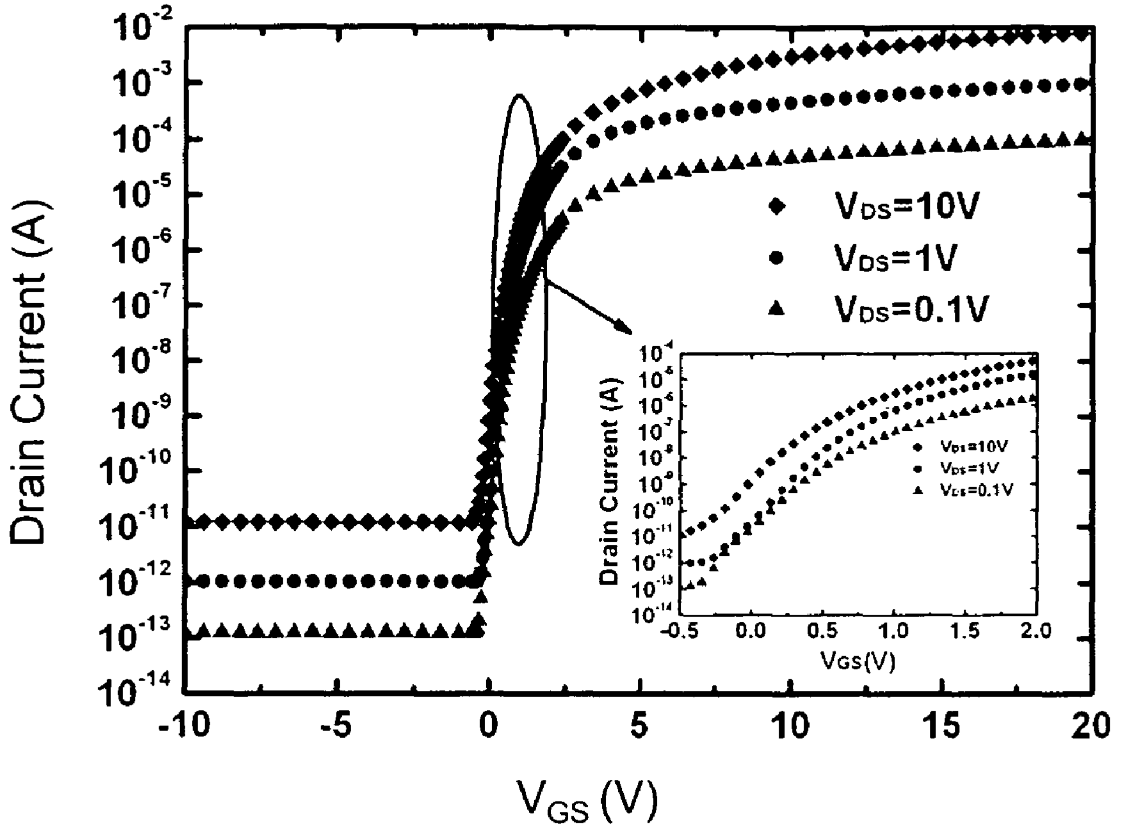
FIG.1C (PELATED ART)

SOURCE-FOLLOWER TYPE ANALOGUE BUFFER, COMPENSATING OPERATION METHOD THEREOF, AND DISPLAY THEREWITH

CROSS-REFERENCE TO RELATED APPLICATION

This is a continuation-in-part application of application Ser. No. 11/356,160, filed on Feb. 16, 2006, which claims the priority benefit of Taiwan patent application serial no. 94128342, filed Aug. 19, 2005. The entirety of each of the above-mentioned patent applications is hereby incorporated by reference herein and made a part of this specification.

BACKGROUND OF THE INVENTION

1. Field of Invention

The present invention relates to an analogue buffer. More particularly, the present invention relates to a source-follow type analogue buffer using poly-Si TFTs for an active matrix display.

2. Description of Related Art

Low temperature poly-Si (LTPS) thin film transistors (TFTs) allow for peripheral integration of driving circuits with a pixel panel of an active matrix display due to a high current driving capability. However, it is well known that the integration of whole driving circuit with poly-Si TFTs is very difficult due to the rather poor characteristics and non-uniformity of poly-Si TFTs compared with single crystal Si large scale integrated circuits (LSIs). Among the driving circuits using poly-Si TFTs, analogue buffers are indispensable to drive the load capacitance of the data bus in the panel. Source follower is considered an excellent candidate for the analogue buffer circuit for the "System on Panel (SOP)" application because of its simplicity and low power dissipation.

A typical source follower 100 using a LTPS TFT in an active matrix display is shown in FIG. 1A. The gate of the TFT 110 in the source follower 100 coupled to a input voltage Vin and the drain of the TFT 110 is coupled to an operation voltage Vdd. The source of the TFT 110 is coupled to ground through a load capacitor (Cload). The waveform of output voltage Vout of the source follower 100 is depicted in FIG. 1B. It is observed that the final output voltage Vout is not kept constant, but exceeds the value of Vin-Vth expected in principle, where the Vth is a threshold voltage of the TFT 110. It is ascribed to the sub-threshold current. As shown in FIG. 1C, which depicts drain current($I_D$) and the voltage between gate and source of the TFT 110 ($V_{GS}$) curves, the sub-threshold swing of LTPS TFTs is about 0.3V/dec which is much larger than that of a metal-oxide-semiconductor field effect transistor (MOSFET) (0.06V/dec). Consequently, the typical source follower 100, as an analogue buffer for active matrix display, will be sensitive to the charging time for various product specifications such as frame rates for the active matrix displays and can not have a constant output voltage.

A further conventional source follower using a poly-Si TFT in a liquid crystal display is shown in FIG. 2A. The source follower 200 includes TFTs M1 and M2, a capacitor C1 and a plurality of switches S1~S4. Node N1, coupled to an input voltage Vin through the switch S1, is connected to node N2 under control of the switch S2 and also connected to a gate of the TFT M1. Node N2 is connected to node N3 under control of the switch S3 and is further connected to node N4. Node N3 is connected to one terminal of the capacitor C1 and a gate terminal of the TFT M2. Node N4 is connected to a data line under control of the switch S4. The voltage level of the node N4 is an output voltage Vout of the source follower 200. A source of the TFT M1 is connected to the ground and the drain of the TFT M1 is connected to node N4, the output terminal. The TFT M2 is a PMOS transistor and its drain is connected to an operation voltage Vdd and its source is connected to the node N4.

Refer to FIG. 2B, which shows a relationship between the input voltage Vin and the output voltage Vout as denoted by the reference number 210. In a perfect case for the source follower, the output voltage Vout should be the same as the input voltage Vin. However, an error voltage which is the difference between the input voltage Vin and the output voltage Vout exists in a practical case. As denoted by the reference number 220, it shows that when the input voltage Vin is increased, the output voltage Vout is not the same as the input voltage Vin and the error voltage is floating from about 80 mV to about 175 mV if the input Vin is changed from 2.5V to 8V. If an output voltage of the source follower is large for driving in the display, for example, 10V, the error voltage may not cause serious influence on the driving operation. However, if the output voltage of the source follower is small for driving in the display voltage, for example, 0.5V~2V, the error voltage may be larger than one gray scale voltage, which will cause serious influence on the display quality.

SUMMARY OF THE INVENTION

Accordingly, the present invention is directed to provide a source-follower type analogue buffer with an active load and a new compensating operation method is developed to reduce the error voltage and also minimize the variation from both the charging time and the device characteristics and maximize the range of the input voltage.

In one embodiment of the present invention, an analogue buffer and a display having a plurality of the source-follower type analogue buffers for driving the load capacitance of a plurality of data buses in the display are provided. The analogue buffer includes a storage capacitor, a driving transistor, and an active load. A first terminal of the storage capacitor is connected to an operation voltage source through a first switch, a second terminal of the storage capacitor is connected to an input terminal of the source-follower type analogue buffer through a third switch. In the driving transistor, a gate terminal of the driving transistor is connected to the first terminal of the storage capacitor, a drain terminal of the driving transistor is connected to the operation voltage source, and a source terminal of the driving transistor is connected to the second terminal of the storage capacitor through a second switch. A first terminal of the active load is connected to the source terminal of the driving transistor and an output terminal of the source-follower type analogue buffer through a fourth switch, and a second terminal of the active load is connected to the ground, the active load is controlled by a bias voltage, wherein input terminal of the source-follower type analogue buffer is connected to the output terminal of the source-follower type analogue buffer through a fifth switch.

During a compensation period, the first switch and the second switch are turned on, thereby a voltage drop is stored in the storage capacitor; and during a data-input period, the input voltage is shifted to a logic high level, the first switch and the second switch are turned off, and the third switch and the fourth switch are turned on, the gate terminal of the driving transistor is applied with the input voltage and the voltage difference hold in the storage capacitor, thereby an output voltage of the analogue buffer is compensated by the voltage stored in the storage capacitor.

In one embodiment of the present invention, a compensating operation method of the analogue buffer above is provided. The analogue buffer includes a driving transistor and a load capacitor. A storage capacitor and a first switch are disposed between a gate terminal and a source terminal of the driving transistor, and a drain terminal of the driving transistor is connected to an operation voltage source, the load capacitor is disposed between an connection of the switch and the source terminal and ground. An input terminal of the source-follower type analogue buffer is connected to an output terminal of the source-follower type analogue buffer through a second switch. The compensating operation method includes, during a compensation period, the first switch is turned on and the storage capacitor is coupled to the operation voltage source, thereby a voltage drop is stored in the storage capacitor. During a data-input period, at a first period of the data-input period, an input voltage is applied to a connection between the storage capacitor and the first switch, thereby the gate terminal of the driving transistor is applied with the input voltage and the voltage difference hold in the storage capacitor, and an output voltage of the analogue buffer is compensated by the voltage stored in the storage capacitor, and at a second period of the data-input period, the second switch is turned on and the input terminal of the source-follower type analogue buffer is connected to the output terminal of the source-follower type analogue buffer.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1C depicts drain current($I_D$) and the voltage between gate and source of the TFT 110 ($V_{GS}$) curves of FIG. 1A.

DESCRIPTION OF EMBODIMENTS

The present invention provides a source-follower type analogue buffer with an active load and a new compensating operation method is developed to reduce an error voltage which is the difference between an input voltage and an output voltage of the analogue buffer. The source-follower type analogue buffer can also minimize the variation from both the charging time and the device characteristics and maximize the range of the input voltage.

Figure 3A:
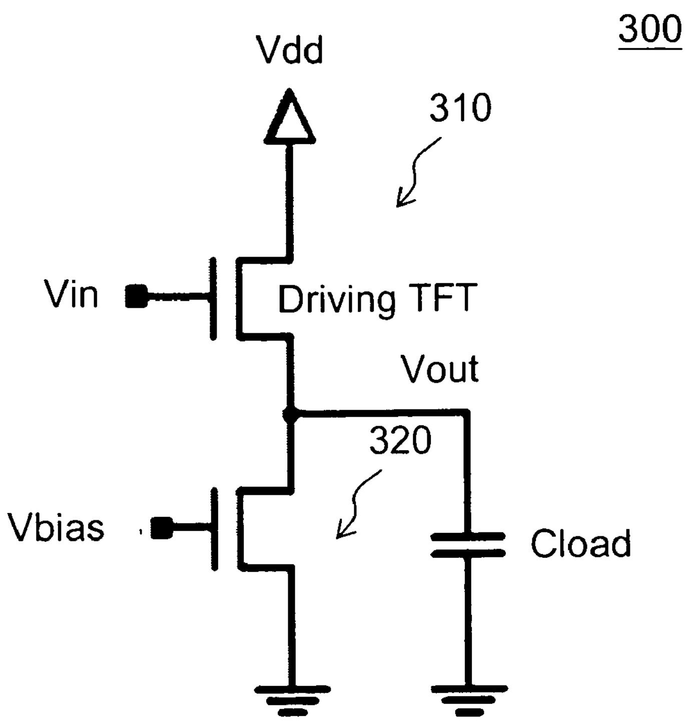
FIG. 3A shows a source-follower type analogue buffer with an active load.
Figure 3B:
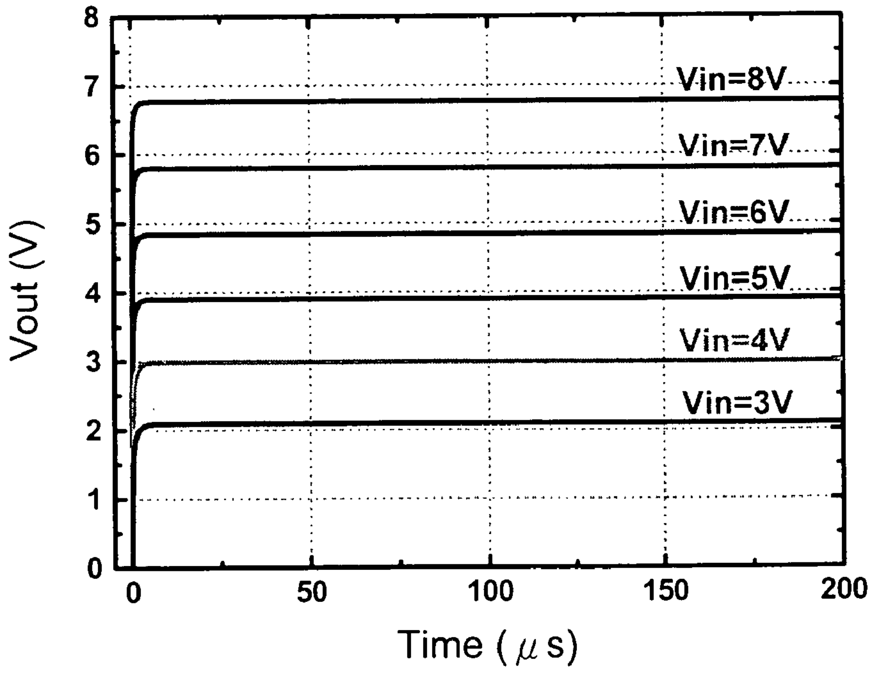
FIG. 3B and FIG. 3C show a respective compensating operation applied to the source-follower type analogue buffer of FIG. 3A.

In a source follower proposed in the parent application filed on Feb. 16, 2006, Ser. No. 11/356,160, entitled "SOURCE-FOLLOWER TYPE ANALOGUE BUFFER, COMPENSATING OPERATION METHOD THEREOF, AND DISPLAY THEREWITH", which the entirety of the above-mentioned patent application is incorporated herewith by reference herein and made a part of this specification. As shown in FIG. 3A, an active load 320, which is, for example, a thin film transistor (TFT), is added. The active load 320 is designed to have a larger channel length (L) for minimizing the DC current and reducing the kink effect. The output voltage Vout waveform is shown in FIG. 3B. It is distinct that the unsaturated phenomenon of the output voltage Vout is diminished. As a result, the source follower 300 with active load is superior to possess charging time variation-tolerant characteristics.

Figure 3C:
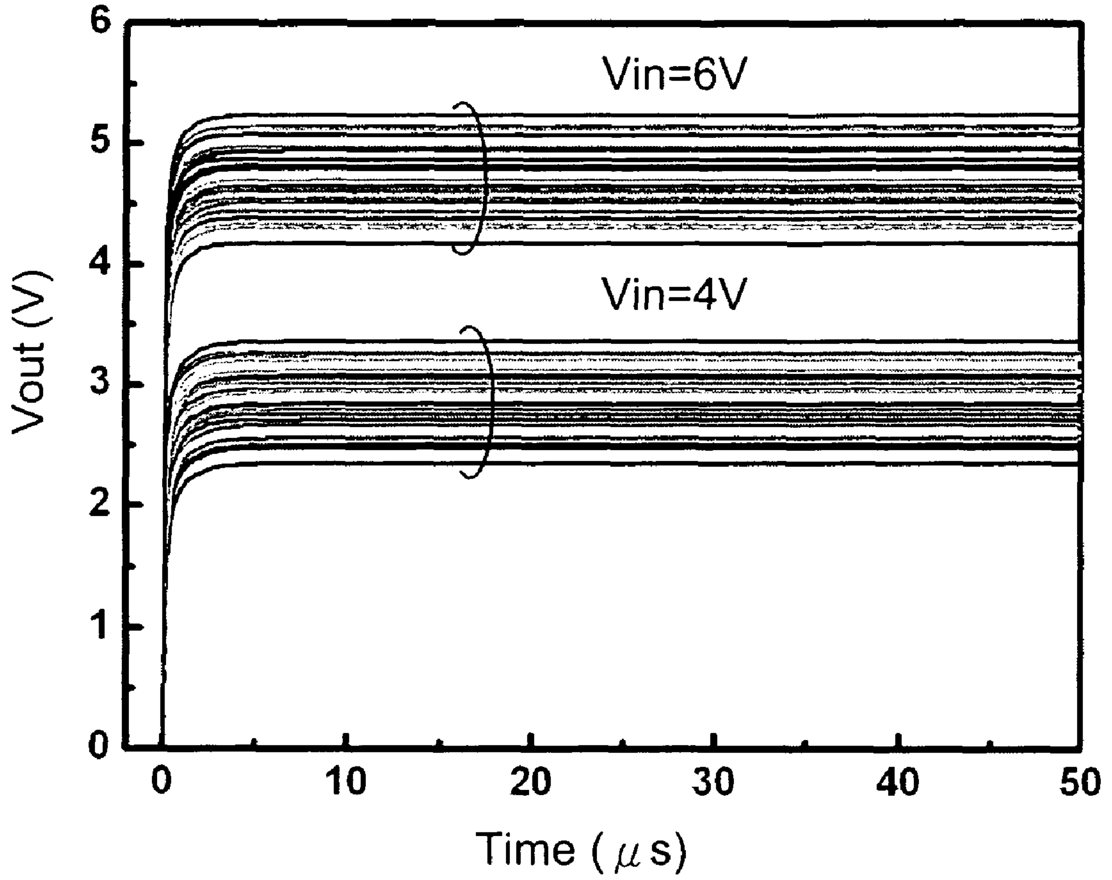

However, if the proposed source follower of FIG. 3A is directly applied to the analogue buffers in the active matrix display, the variations of the LTPS thin film transistors (TFTs), such as threshold voltage or mobility etc., are considered for applications. Please also refer to FIG. 3C, which show the simulated output voltage (Vout) waveform versus the operation time of the source followers where the same input voltage Vin, which is 4 volts or 6 volts, is applied thereto. It is clear that the typical source followers suffer from huge variations due to the LTPS TFTs variation.

Figure 4A:
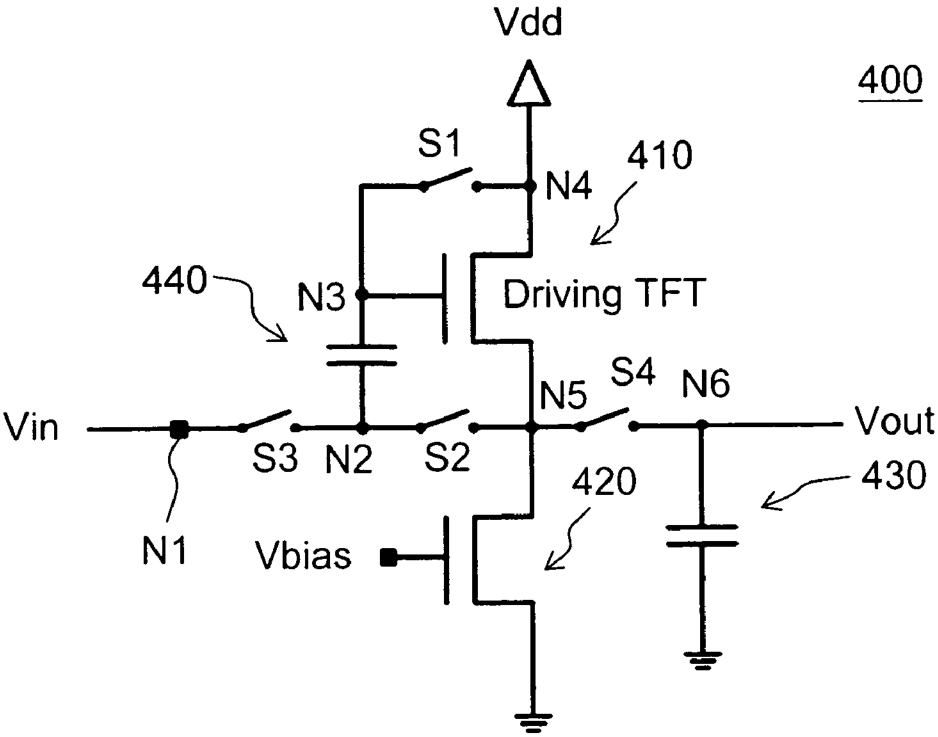
FIG. 4A shows a source-follower type analogue buffer with an active load.

Please refer to FIG. 4A, a source-follower type analogue buffer 400 with an active load 420, which is also proposed in the above-mentioned parent application, is introduced herein. The source-follower type analogue buffer 400 includes a driving TFT 410, an active load 420, a load capacitor 430, a storage capacitor 440 and a plurality of switches S1~S4. The driving TFT 410 is a thin film transistor (TFT), for example, a Low temperature poly-Si TFT. The active load 420 is a thin film transistor (TFT) and an gate terminal is constantly biased at a voltage level Vbias.

Node N1 which is coupled to an input voltage Vin is connected to node N2 under control of the switch S3. Node N2 is connected to one terminal of the storage capacitor 440 and is further connected to node N5 under control of the switch S2. Node N3 is connected to the other terminal of the storage capacitor 440 and a gate terminal of the driving TFT 410, and is further connected to node N4 under control of the switch S1. Node N4 is coupled to an operation voltage Vdd and is also connected to a drain terminal of the driving TFT 410. Node N5 is connected to the active load 420 and a source terminal of the driving TFT 410, and is further connected to node N6 under control of the switch S4. Node N6 is connected to the load capacitor 430. The voltage level of the node N6 is an output voltage Vout of the source-follower-type analogue buffer 400.

Figure 4B:
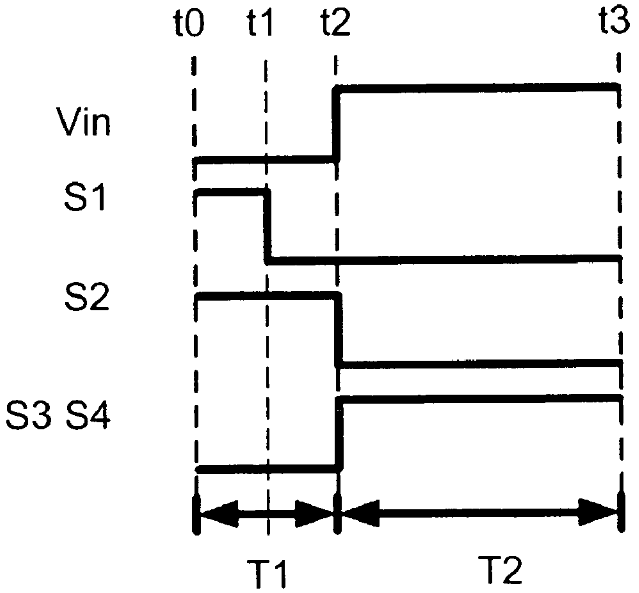
FIG. 4B and FIG. 4C show a respective compensating operation applied to the source-follower type analogue buffer of FIG. 4A.
Figure 4C:
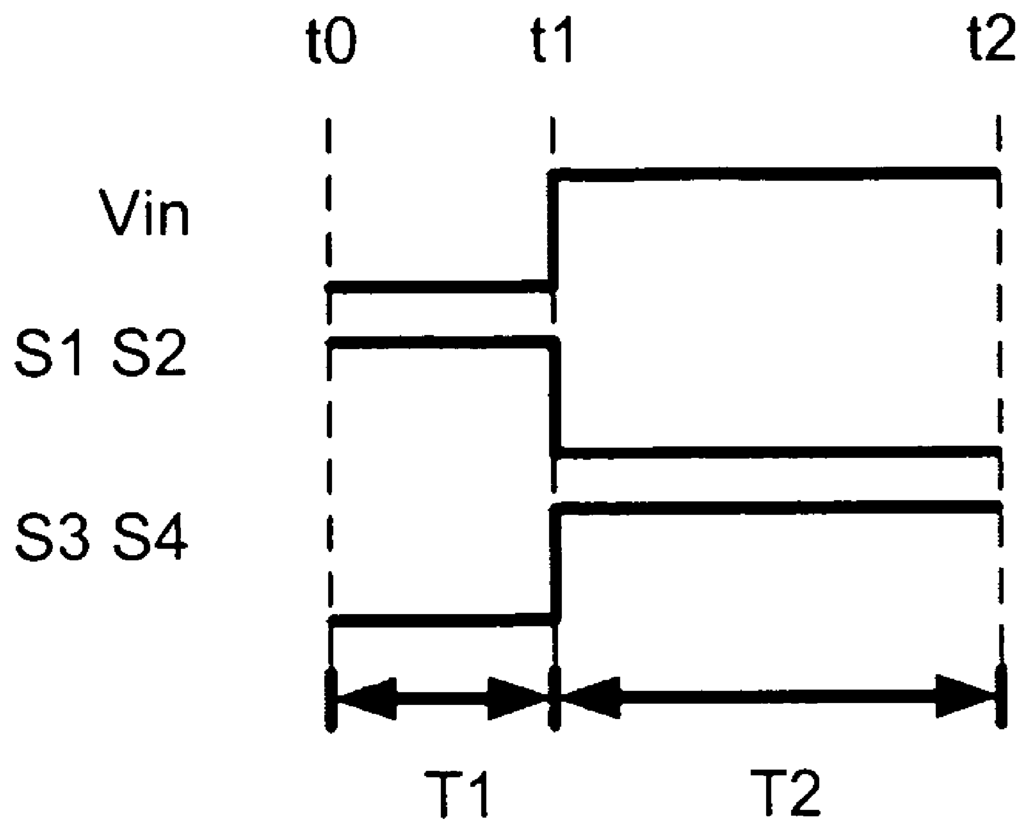

A compensating operation method proposed in the above-mentioned parent application to minimize the variation from both the charging time and the device characteristics and maximize the range of the input voltage. Alternative proposals are depicted in FIG. 4B and FIG. 4C, for example. Please refer to FIG. 4B first, accompanying with the analogue buffer 400 shown in FIG. 4A. At time t0, the gate voltage of the TFT as the active load 420 is constantly biased at the voltage level Vbias. During a compensation period T1, switches S1 and S2 are turned on from time t0 to time t1, and at time t1, the switch S1 is turned off. At the end of the compensation period T1, that is, time t2, the switch S2 is turned off. Thereby, a voltage drop is stored in the storage capacitor 440.

During a data-input period T2, an input voltage Vin is shifted to a logic high level and applied to node N1, and the switches S3 and S4 are turned on. The gate terminal of the driving TFT 410 is applied with the input voltage Vin voltage and the voltage difference hold in the storage capacitor 440. Thus, the output voltage is compensated by the voltage stored in the storage capacitor 440.

Please refer to FIG. 4C for the other proposal of compensating operation, accompanying with the analogue buffer 400 shown in FIG. 4A. At time t0, the gate voltage of the TFT as the active load 420 is constantly biased at the voltage level Vbias. During a compensation period T1, switches S1 and S2 are turned on for the whole compensation period T1. At the end of the compensation period T1, that is, time t1, the switches S1 and S2 are turned off. Thereby, a voltage drop is stored in the storage capacitor 440. During a data-input period T2, an input voltage Vin is shifted to a logic high level and applied to node N1, and the switches S3 and S4 are turned on. The gate terminal of the driving TFT 410 is applied with the input voltage Vin voltage and the voltage difference hold in the storage capacitor 440. Thus, the output voltage is compensated by the voltage stored in the storage capacitor 440.

However, in considering the error voltage which is the difference between an input voltage and an output voltage of the analogue buffer, a new architecture is proposed in the present invention. Please refer to FIG. 5A, a source-follower type analogue buffer 500 with an active load 520, which is a preferred embodiment of the invention, is introduced herein. The source-follower type analogue buffer 500 includes a driving TFT 510, an active load 520, a storage capacitor 530 and a plurality of switches S1~S5. The driving TFT 510 is a thin film transistor (TFT), for example, a Low temperature poly-Si TFT. The active load 520 is a thin film transistor (TFT) and an gate terminal is constantly biased at a voltage Vbias.

Node N1 which is connected to an input voltage (Vin) source is connected to node N2 under control of the switch S3, and is also connected to a node N6 under control of the switch S5. Node N2 is connected to one terminal of the storage capacitor 530 and is further connected to node N5 under control of the switch S2. Node N3 is connected to the other terminal of the storage capacitor 530 and a gate terminal of the driving TFT 510, and is further connected to node N4 under control of the switch S1. Node N4 is coupled to an operation voltage Vdd and is also connected to a drain terminal of the driving TFT 510. Node N5 is connected to the active load 520 and a source terminal of the driving TFT 510, and is further connected to node N6 under control of the switch S4. Voltage level at Node N6 is an output voltage Vout of the source-follower type analogue buffer 500.

A compensating operation method proposed in the invention is herein proposed to reduce the error voltage between the input voltage and the output voltage, and also to minimize the variation from both the charging time and the device characteristics and maximize the range of the input voltage. An embodiment of the present invention for the operating principle is depicted in FIG. 5B, for example. Please refer to FIG. 5B first, accompanying with the analogue buffer 500 shown in FIG. 5A. At time t0, the gate voltage of the TFT as the active load 520 is constantly biased at the voltage level Vbias. During a compensation period T1, switches S1 and S2 are turned on from time t0 to time t1, and at time t1, the switch S1 is turned off. At the end of the compensation period T1, that is, time t2, the switch S2 is turned off. Thereby, a voltage drop is stored in the storage capacitor 530.

During a period from time t2 to time t3 within a data-input period T2, an input voltage Vin is shifted to a logic high level and applied to node N1, and the switches S3 and S4 are turned on. The gate terminal of the driving TFT 510 is applied with the input voltage Vin voltage and the voltage difference hold in the storage capacitor 530. Thus, the output voltage is compensated by the voltage stored in the storage capacitor 530. During a period from time t3 to time t4 within a data-input period T2, the switches S3 and S4 are turned off and the switch S5 is turned on, for coupling the output voltage Vout to the input voltage Vin. The influence by the error voltage, which is the difference between an input voltage and an output voltage of the analogue buffer 500, can be significantly reduced by coupling the output voltage Vout to the input voltage Vin during the period from time t3 to time t4.

Figure 5A:
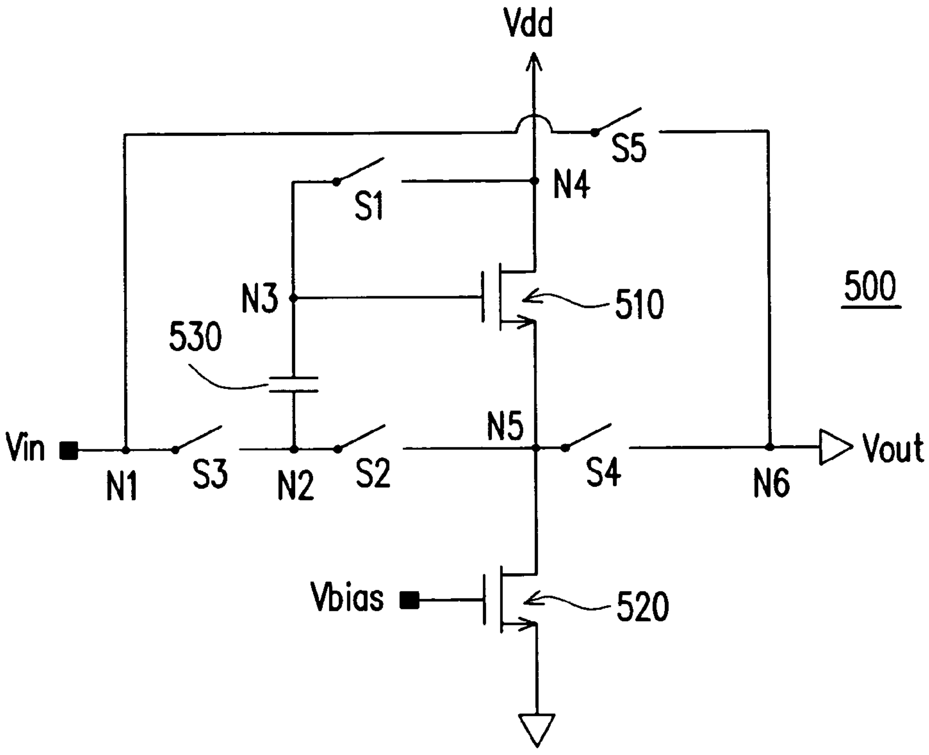
FIG. 5A shows a source-follower type analogue buffer with an active load of a preferred embodiment of the invention.
Figure 5B:
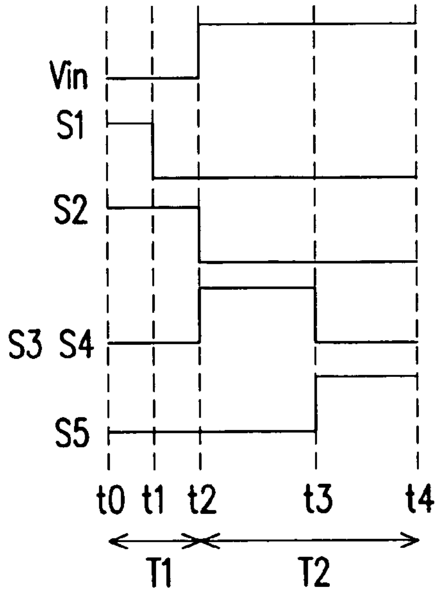
FIG. 5B shows a respective compensating operation applied to the source-follower type analogue buffer of FIG. 5A.
Figure 6A:
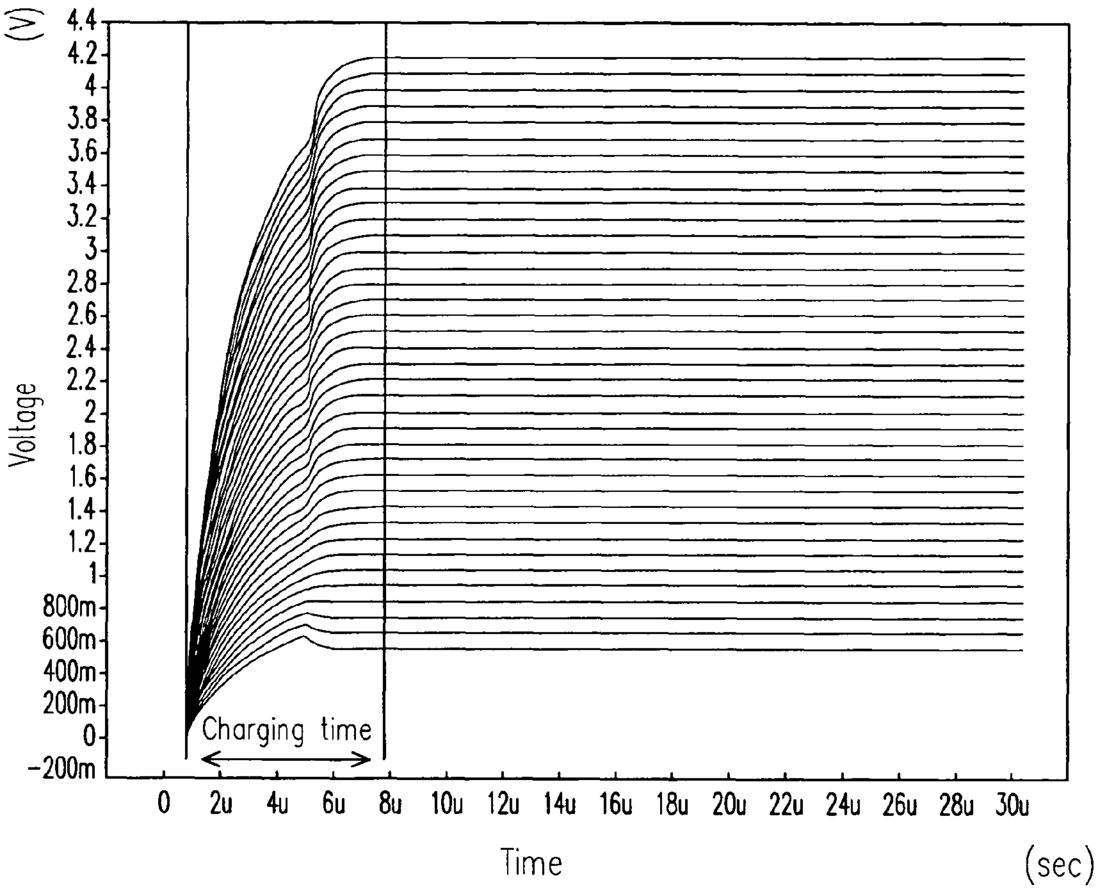
FIG. 6A show a simulation results of the source-follower type analogue buffer of FIG. 5A when the input voltage is varied.

Please refer to FIG. 6A, which shows a simulation results of the source-follower type analogue buffer 500 of FIG. 5A when the input voltage is varied. In the FIG. 6A, the simulated output voltage (Vout) waveform versus the operation time of the source-follower type analogue buffer 500. The proposed source-follower type analogue buffer 500 and the compensating operation method therewith in the invention can minimize the variation from both the charging time and the device characteristics and maximize the range of the input voltage. The charging time in the proposed source-follower type analogue buffer 500 is lower than 15 μs (microsecond) and the charging time in the conventional source-follower type is larger than that of the invention. From the FIG. 6A, it can be shown that the changing time is about 8 μs.

Figure 6B:
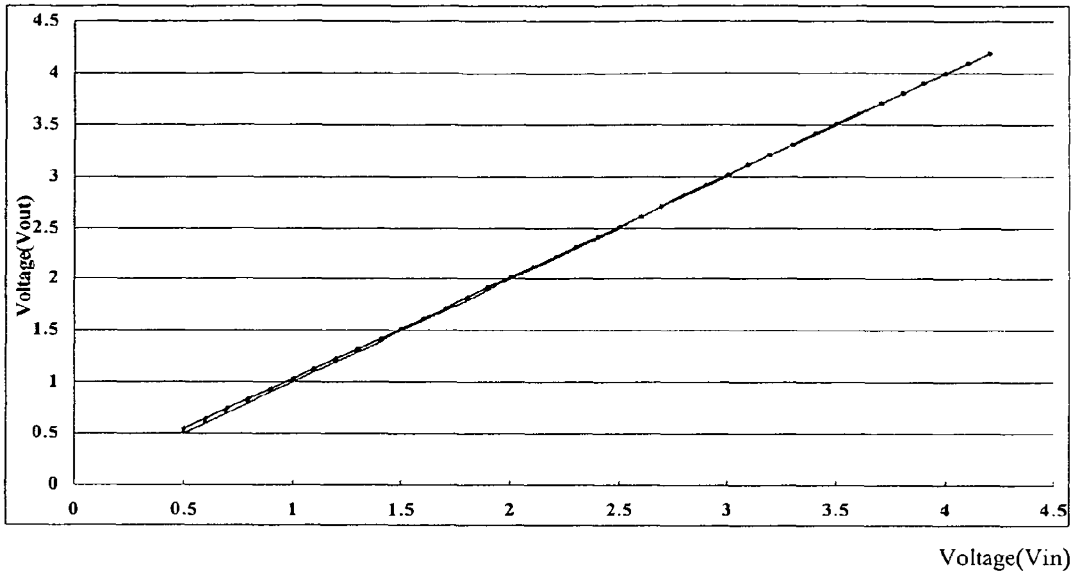
FIG. 6B, which shows a relationship between the input voltage Vin and the output voltage Vout of the source-follower type analogue buffer of FIG. 5A.
Figure 6C:
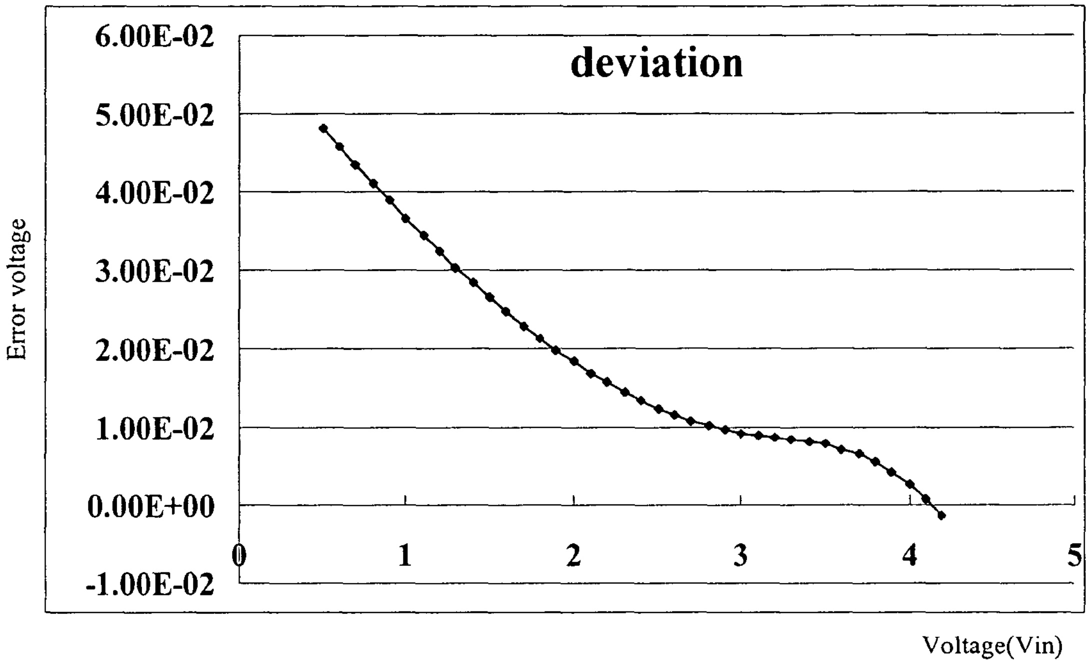
FIG. 6C shows a relationship between the input voltage Vin and the error voltage in the proposed source-follower type analogue buffer of FIG. 5A.

Please also refer to FIG. 6B, which shows a relationship between the input voltage Vin and the output voltage Vout of the proposed source-follower type analogue buffer 500. The linearity of the relationship between the input voltage Vin and the output voltage Vout is improved. The voltage difference between the input voltage Vin and the output voltage Vout is significantly reduced, which means that the error voltage is decreased in the proposed source-follower type analogue buffer 500 and the compensating operation method therewith. Please also refer to FIG. 6C, which shows a relationship between the input voltage Vin and the error voltage in the proposed source-follower type analogue buffer 500. The error voltage is reduced to be lower than 0.05 (5.00E-02) V, which is significantly reduced rather than that in the conventional source-follower type analogue buffer.

Figure 1A:
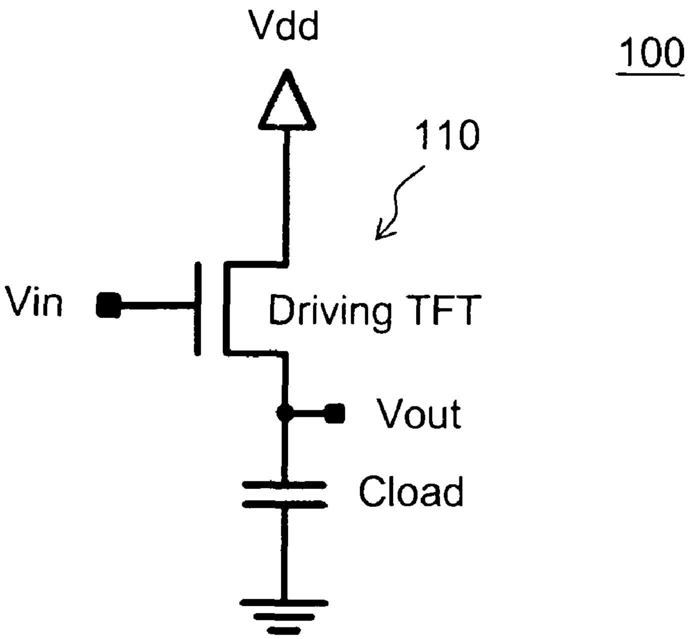
FIG.1A (RELATED ART)
FIG. 1A is a schematic block diagram of a typical source follower using a LTPS TFT in an active matrix display.
Figure 1B:
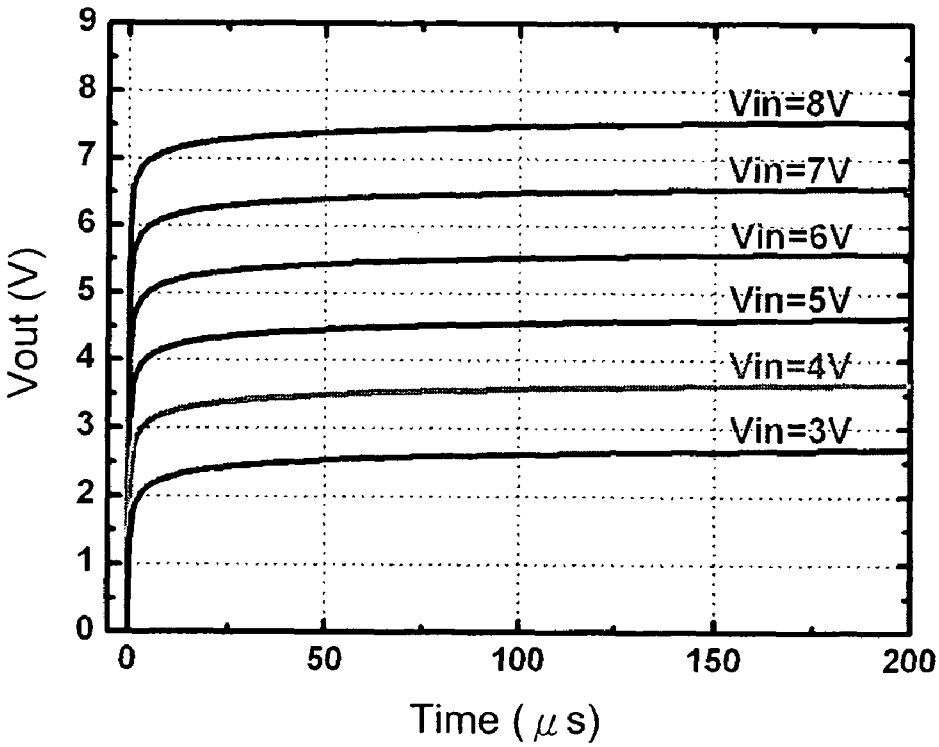
FIG.1B (RELATED ART)
FIG. 1B shows a waveform of output voltage Vout of the source follower of FIG. 1A.
Figure 2A:
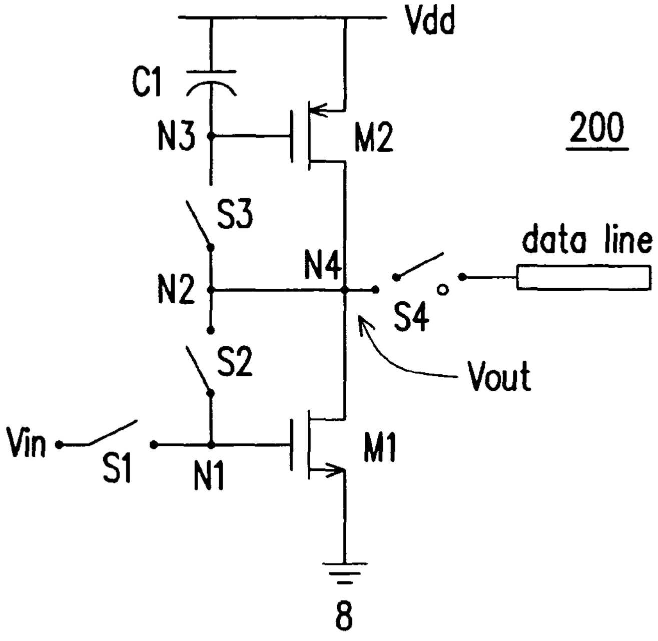
FIG. 2A(RELATED ART)
FIG. 2A shows a source follower.
Figure 2B:
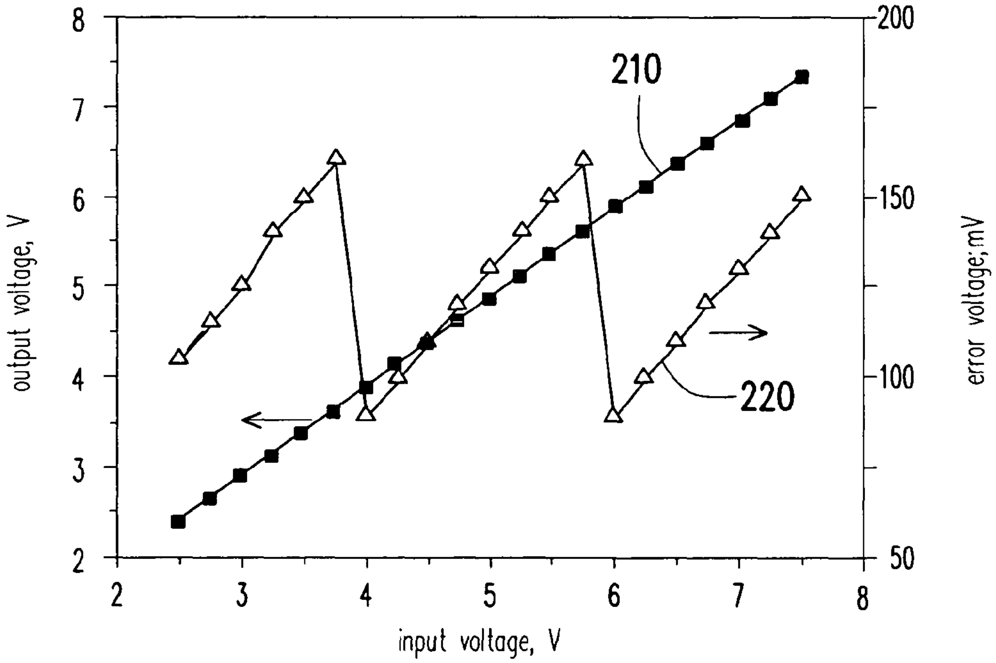
FIG. 2B(RELATED ART)
FIG. 2B shows a output voltage waveform of the source follower of FIG. 2A.
Figure 7A:
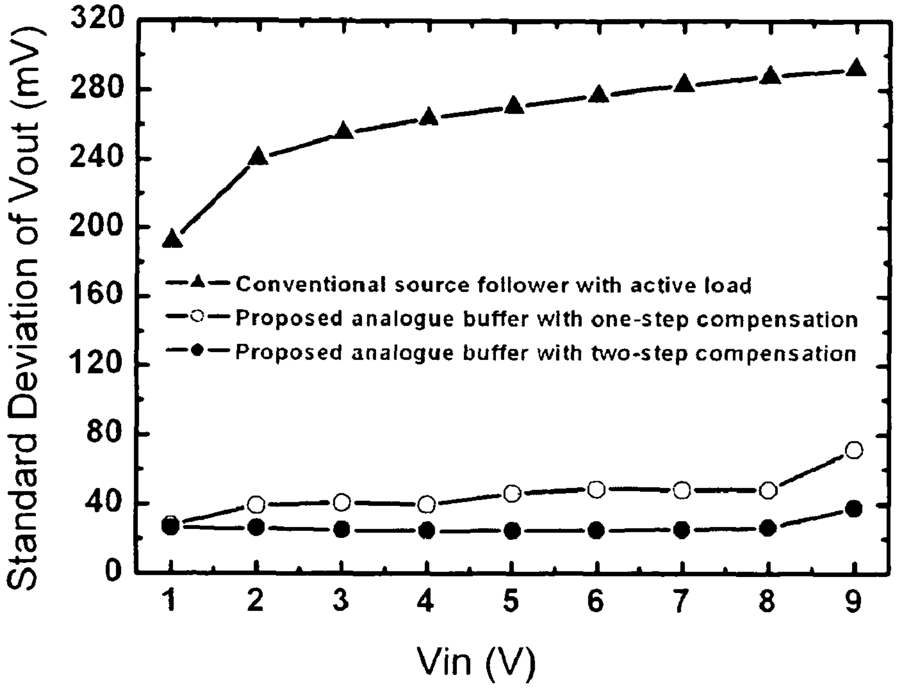
FIG. 7A shows a Monte Carlo simulation results of the source-follower type analogue buffer of FIG. 3A when the input voltage is 4V, 5V or 6V.
Figure 7B:
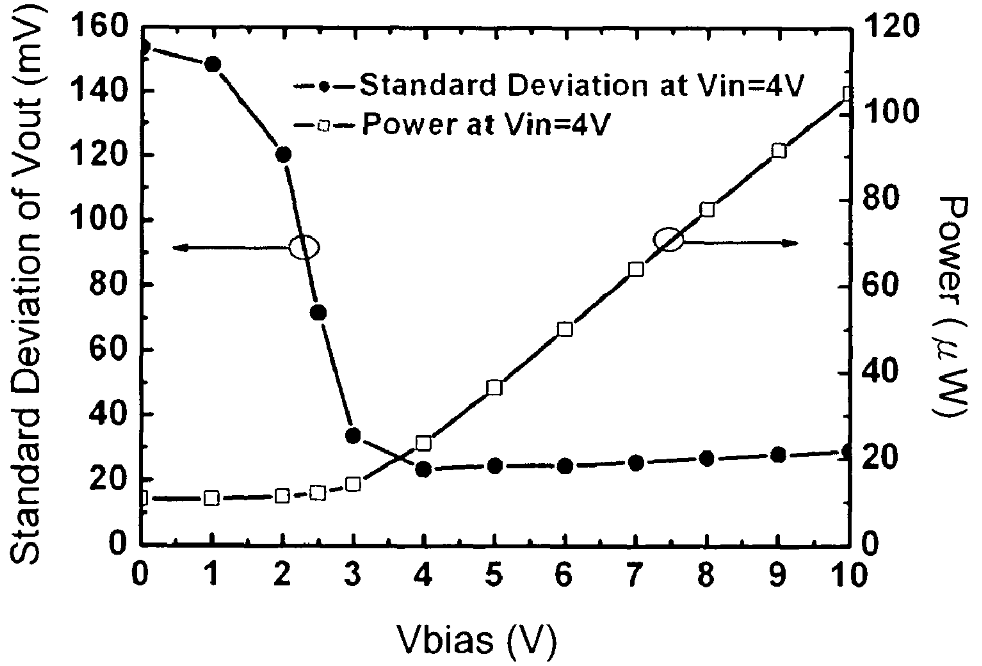
FIG. 7B shows results of the standard deviation of output voltage and the power consumption related to Vbias in the Chung's analogue buffer, Kida's double offset canceling analogue buffer and the proposed analogue buffer of the present invention from the Monte Carlo simulation.

The Monte Carlo simulation results of the source-follower type analogue buffer 500 of FIG. 5A when the input voltage is 4V, 5V or 6V, are shown in FIG. 7A, which show the simulated output voltage (Vout) waveform versus the operation time of the source-follower type analogue buffer 500. To study the effect of the device variation on circuit performance, Monte Carlo simulation with an assumption of normal distribution is executed where in the mean value and the deviation of the threshold voltage and mobility are 1V, 1V, 77.1 $cm^2/vs$ and 20 $cm^2/vs$, respectively. Each of the LTPS TFTs in the circuit simulation varies independently. Comparing the results of source follower 200 of FIG. 2A, it is clear that the source followers 200 suffer from much more variations due to the LTPS TFTs variation than the source-follower type analogue buffer 500 of FIG. 5A.

The source-follower-type analogue buffer of the present invention has characteristics of high immunity to the variation of poly-Si TFT characteristics, capability of simple configuration, low power consumption and capability of minimizing the signal timing variation (that is, unsaturated phenomenon). The source-follower-type analogue buffer of the present invention is suitable for use in an active matrix display, for example, an active matrix liquid crystal display (AMLCD) or an active matrix organic light emitting display (AMOLED). More particularly, the source-follower-type analogue buffer of the present invention is suitable for use in the "System on Panel" applications for the AMLCD or AMOLED. The proposed analogue buffers are indispensable to drive the load capacitance of the data bus in the panel among the driving circuits using poly-Si TFTs.

Figure 8A:
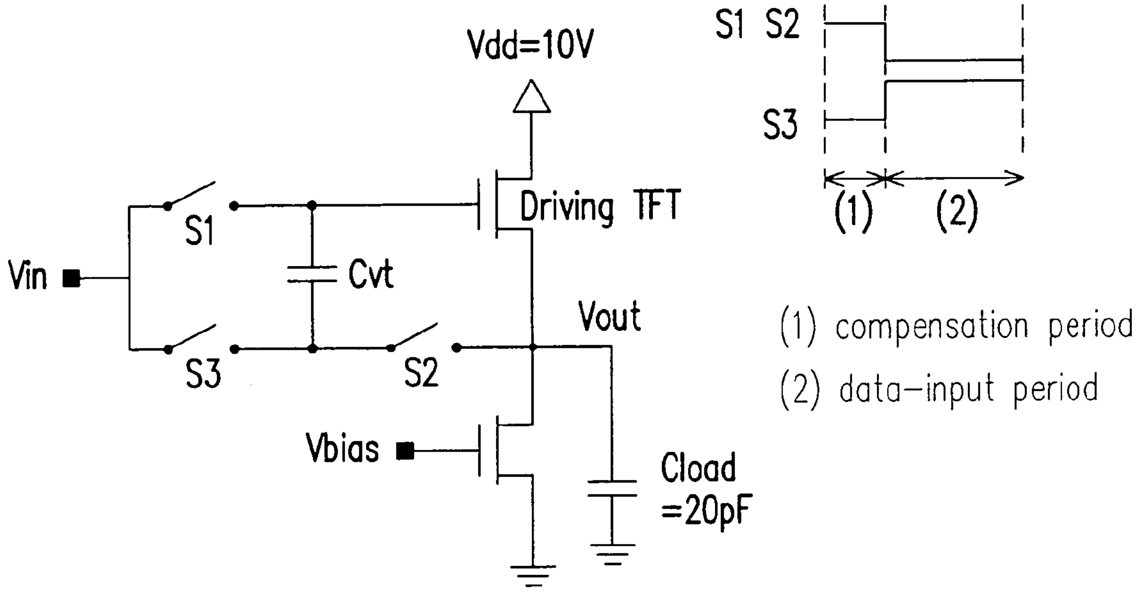
FIG. 8A shows a schematic of the Chung's analogue buffer with an active load and its operation principles.
Figure 8B:
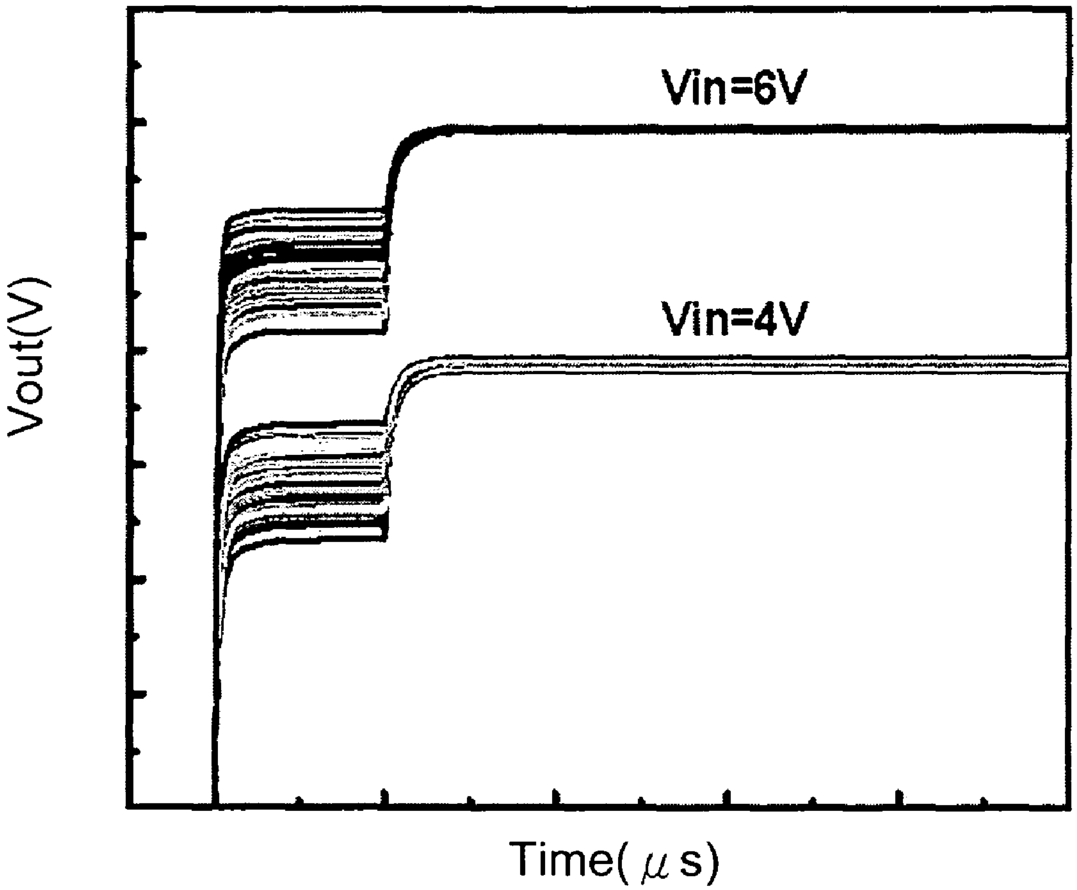
FIG. 8B shows the Monte Carlo simulation results of the output voltage variation of the Chung's analogue buffer of FIG. 8A.
Figure 9A:
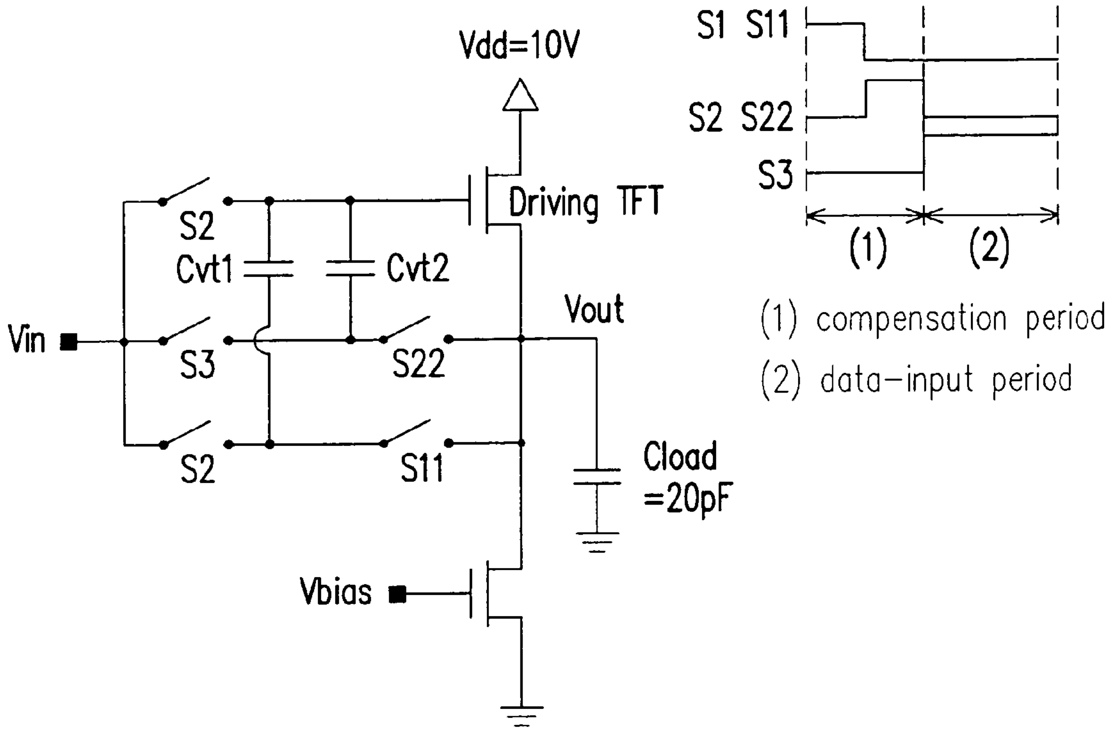
FIG. 9A shows a Kida's double offset canceling analogue buffer with an active load.
Figure 9B:
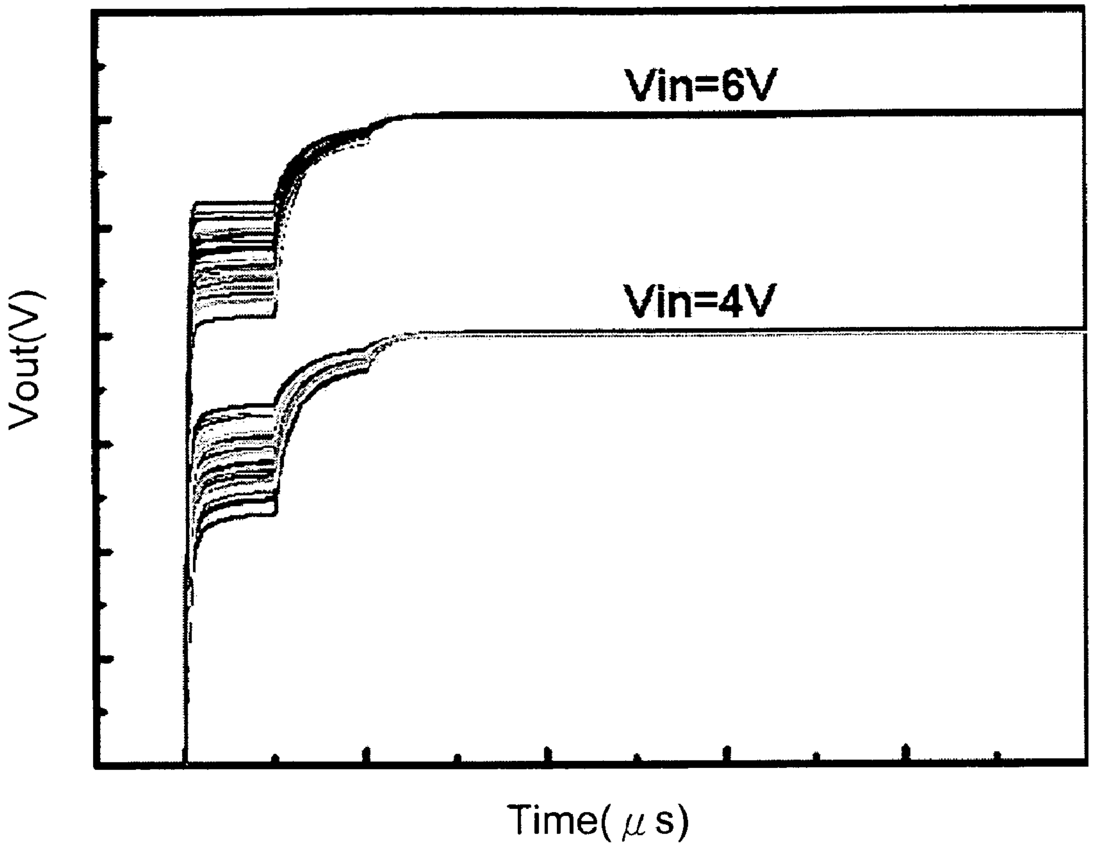
FIG. 9B shows the Monte Carlo simulation results of the output voltage variation of the Kida's double offset canceling analogue buffer with an active load.

Several conventional source-follower type analogue buffers with an active load are proposed in the art. Please refer to FIG. 8A, which shows a schematic of the Chung's analogue buffer with an active load and its operation principles (H. J. Chung, S. W. Lee and C. H. Han, IEE Electronics Letters, Vol. 37, p. 1093, 2001), and FIG. 8B shows the Monte Carlo simulation results of the output voltage variation. Please also refer to FIG. 9A, which shows Kida's analogue buffer (Y. Kida, Y. Nakajima, M. Takatoku, M. Minegishi, S. Nakamura, Y. Maki and T. Maekawa, EURODISPLAY, p. 831, 2002) with an active load and its Monte Carlo simulation results are also shown in FIG. 9B.

Figure 10A:
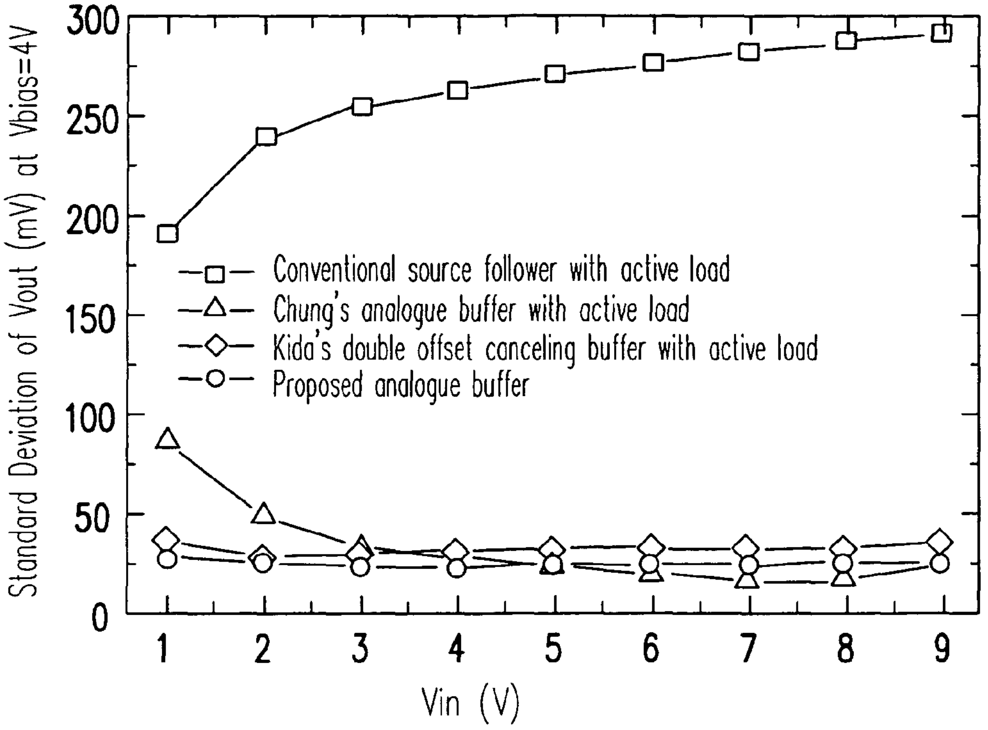
FIG. 10A shows results of comparing the standard deviations of output voltage in the conventional source follower, Chung's analogue buffer, Kida's double offset canceling analogue buffer and the proposed analogue buffer of the present invention calculated from the Monte Carlo simulation.
Figure 10B:
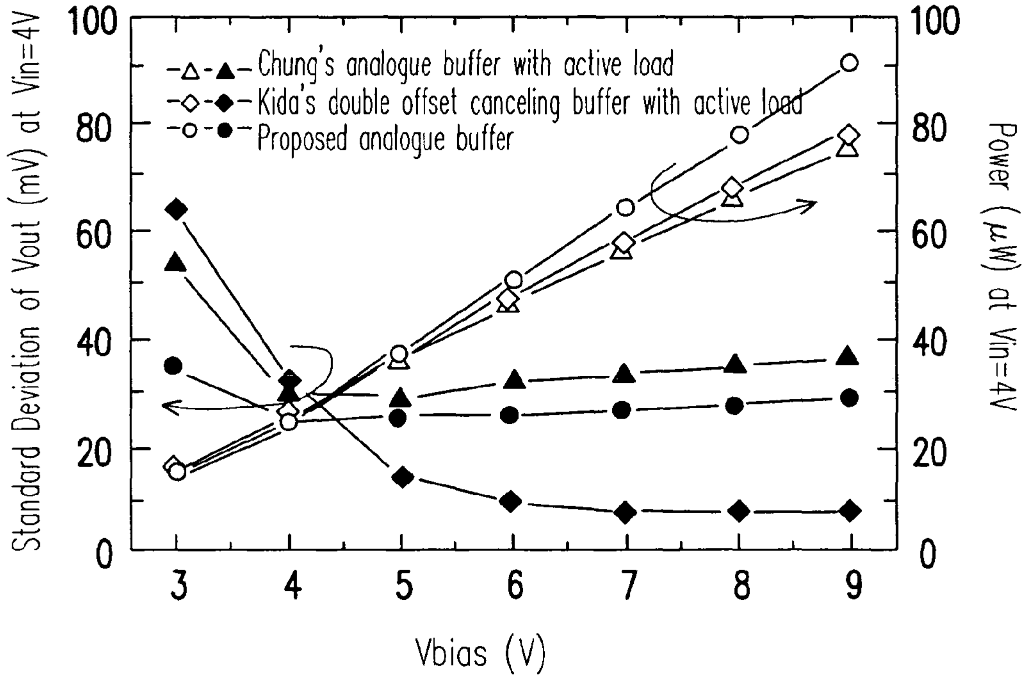
FIG. 10B shows results of the standard deviation of output voltage and the power consumption related to Vbias in the Chung's analogue buffer, Kida's double offset canceling analogue buffer and the proposed analogue buffer of the present invention from the Monte Carlo simulation.

Please refer to FIG. 10A, which compares the standard deviations of output voltage in the conventional source follower, Chung's analogue buffer, Kida's double offset canceling analogue buffer and the proposed analogue buffer of the present invention calculated from the Monte Carlo simulation results. All of the circuits include the active load to eliminate the unsaturated behavior. The merits of the proposed analogue buffer of the present invention including wide operation range and small deviation are distinguished over the prior arts. Furthermore, the deviation is less dependent on the input voltage, reflecting the good compensation of the proposed circuit. The standard deviation of output voltage and the power consumption related to Vbias are shown in FIG. 10B, which reveals that the Vbias should be properly designed to minimize the deviation with lowest power consumption.

Figure 11:
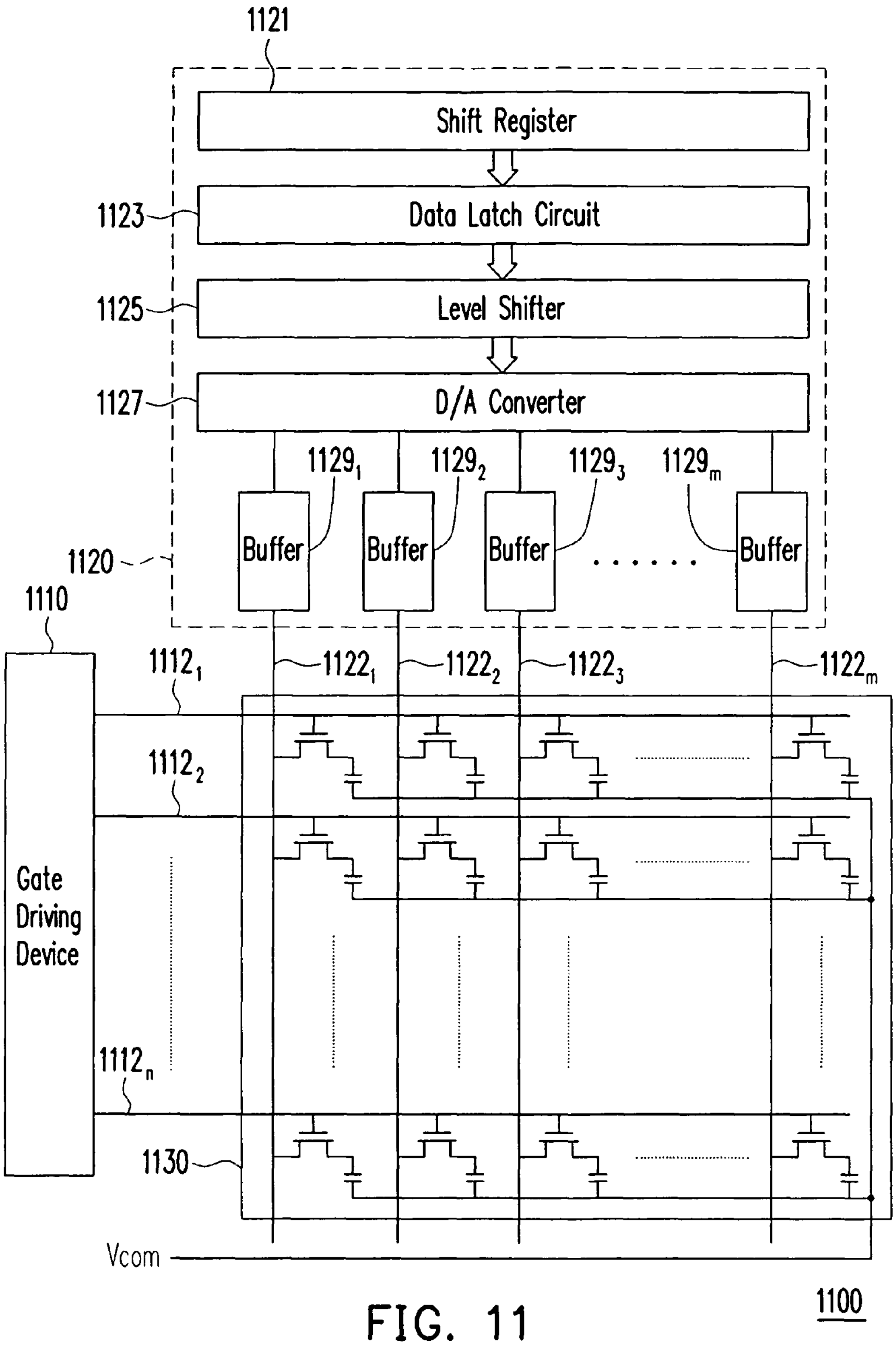
FIG. 11 shows an embodiment of the present invention relating to a display having a plurality of source-follower-type analogue buffers for driving the load capacitance of a plurality of data buses therein.

A source-follower type analogue buffer of the invention has characteristics of high immunity to the variation of poly-Si TFT characteristics, capability of simple configuration, low power consumption and capability of minimizing the signal timing variation (that is, unsaturated phenomenon), which is suitable for driving loads of multiple data bus in an active matrix display. The display has a plurality of source-follower type analogue buffers for driving the load capacitance of a plurality of data buses in the display, which is shown in FIG. 11. The display 1100 includes a panel 1110, a gate driving device 1110 and a source driving device 1120. A plurality of gate lines, for example, n gate lines $\mathbf{1112}_1$, $\mathbf{1112}_2$, $\mathbf{1112}_3$ . . . , $\mathbf{1112}_n$ of the gate driving device 1110 are connected to the panel 1130, and a plurality of data lines, for example, m data lines $\mathbf{1122}_1$, $\mathbf{1122}_2$, $\mathbf{1122}_3$ . . . , $\mathbf{1122}_m$ of the source driving device 1120 are connected to the panel 1130, and the gate lines and the data lines are interconnected in an array manner. A plurality of pixels are interposed between the interconnections of the gate lines and the data lines.

The source driving device 1120 includes, for example, a shift register 1121, a data latch circuit 1123, a level shifter 1125, a digital/analog converter 1127 and a buffer device 1129. The buffer device 1129 includes m buffer unit $\mathbf{1129}_1$, $\mathbf{1129}_2$, $\mathbf{1129}_3$, . . . , $\mathbf{1129}_m$ for coupling to the corresponding data lines $\mathbf{1122}_1$, $\mathbf{1122}_2$, $\mathbf{1122}_3$ . . . , and $\mathbf{1122}_m$. The buffer unit $\mathbf{1129}_1$, $\mathbf{1129}_2$, $\mathbf{1129}_3$, . . . , $\mathbf{1129}_m$ is the analogue buffers as introduced in the aforesaid embodiments of the present invention. The source-follower-type analogue buffers of the present invention is suitable for use in the "System on Panel" (SoP) applications for the AMLCD or AMOLED. The proposed analogue buffers are indispensable to drive the load capacitance of the data bus in the panel among the driving circuits using poly-Si TFTs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An source-follower type analogue buffer, comprising:

a storage capacitor, wherein a first terminal of the storage capacitor is connected to an operation voltage source through a first switch (S1), a second terminal of the storage capacitor is connected to an input voltage (Vin) source through a third switch (S3);

a driving transistor, wherein a gate terminal of the driving transistor is connected to the first terminal of the storage capacitor, a drain terminal of the driving transistor is connected to the operation voltage source, and a source terminal of the driving transistor is connected to the second terminal of the storage capacitor through a second switch (S2); and an active load, wherein a first terminal of the active load is connected to the source terminal of the driving transistor and an output terminal of the source-follower type analogue buffer through a fourth switch (S4), and a second terminal of the active load is connected to the ground, the active load is controlled by a bias voltage, wherein the input voltage source is connected to the output terminal of the source-follower type analogue buffer through a fifth switch (S5).

2. The source-follower type analogue buffer as claimed in claim 1, wherein the driving transistor is a low temperature poly-Si (LTPS) thin film transistor (TFT).

3. The source-follower type analogue buffer as claimed in claim 1, wherein the active load is a low temperature poly-Si (LTPS) thin film transistor (TFT).

4. A compensating operation method of an analogue buffer, the analogue buffer comprising a driving transistor and a load capacitor, wherein a storage capacitor and a first switch are disposed between a gate terminal and a source terminal of the driving transistor, and a drain terminal of the driving transistor is connected to an operation voltage source, the load capacitor is disposed between an connection of the switch and the source terminal and ground, wherein an input voltage source is connected to an output terminal of the source-follower type analogue buffer through a second switch, wherein the compensating operation method comprising:

during a compensation period, the first switch is turned on and the storage capacitor is coupled to the operation voltage source, thereby a voltage drop is stored in the storage capacitor; and during a data-input period, at a first period of the data-input period, an input voltage is applied to a connection between the storage capacitor and the first switch, thereby the gate terminal of the driving transistor is applied with the input voltage and the voltage difference hold in the storage capacitor, and an output voltage of the analogue buffer is compensated by the voltage stored in the storage capacitor, and at a second period of the data-input period, the second switch is turned on and the input voltage source is connected to the output terminal of the source-follower type analogue buffer.

5. The compensating operation method as claimed in claim 4, wherein during a predetermined time interval after stopping the storage capacitor being coupled to the operation voltage source, the first switch is turned off.

6. The compensating operation method as claimed in claim 5, wherein the active load is a low temperature poly-Si (LTPS) thin film transistor (TFT) and is controlled by a bias voltage.

7. A display having a plurality of source-follower type analogue buffers for driving the load capacitance of a plurality of data buses in the display, each of the source-follower type analogue buffer comprising:

a storage capacitor, wherein a first terminal of the storage capacitor is connected to an operation voltage source through a first switch (S1), a second terminal of the storage capacitor is connected to an input voltage source through a third switch (S3);

a driving transistor, wherein a gate terminal of the driving transistor is connected to the first terminal of the storage capacitor, a drain terminal of the driving transistor is connected to the operation voltage source, and a source terminal of the driving transistor is connected to the second terminal of the storage capacitor through a second switch (S2); and an active load, wherein a first terminal of the active load is connected to the source terminal of the driving transistor and an output terminal of the source-follower type analogue buffer through a fourth switch (S4), and a second terminal of the active load is connected to the ground, the active load is controlled by a bias voltage, wherein the input voltage source is connected to the output terminal of the source-follower type analogue buffer through a fifth switch (S5).

8. The display as claimed in claim 7, wherein the driving transistor is a low temperature poly-Si (LTPS) thin film transistor (TFT).

9. The display as claimed in claim 7, wherein the active load is a low temperature poly-Si (LTPS) thin film transistor (TFT).

* * * * *